US008422765B2

(12) United States Patent
Tsai et al.

(10) Patent No.: US 8,422,765 B2
(45) Date of Patent: Apr. 16, 2013

(54) THREE-DIMENSIONAL IMAGE ANALYSIS SYSTEM, PROCESS DEVICE, AND METHOD THEREOF

(75) Inventors: Augustine Tsai, Taipei (TW); I-Chou Hong, Dongshan Township, Yilan County (TW); Sung-Chun Liang, Taipei (TW); Fu-Chun Hsu, Taipei (TW)

(73) Assignee: Institute For Information Industry, Taipei (TW)

( * ) Notice: Subject to any disclaimer, the term of this patent is extended or adjusted under 35 U.S.C. 154(b) by 681 days.

(21) Appl. No.: 12/628,823

(22) Filed: Dec. 1, 2009

(65) Prior Publication Data

US 2011/0123096 A1 May 26, 2011

(30) Foreign Application Priority Data

Nov. 26, 2009 (CN) .......................... 2009 1 0225814

(51) Int. Cl.
*G06T 15/00* (2011.01)
(52) U.S. Cl.
USPC .......................................................... 382/154
(58) Field of Classification Search ........................ None
See application file for complete search history.

(56) References Cited

U.S. PATENT DOCUMENTS

| 7,509,241 | B2 * | 3/2009 | Guo et al. ......................... 703/2 |
| 7,643,025 | B2 * | 1/2010 | Lange ............................ 345/419 |
| 2007/0136408 | A1 * | 6/2007 | Wheeler et al. ............... 708/290 |
| 2008/0137989 | A1 * | 6/2008 | Ng et al. ........................ 382/285 |
| 2010/0034426 | A1 * | 2/2010 | Takiguchi et al. ............. 382/106 |

OTHER PUBLICATIONS

Hartmut Surmann et al., an autonomous mobile robot with a 3D laser range finder for 3D, Robotics and Autonomous Systems 45, 2003, pp. 181-198.*

* cited by examiner

*Primary Examiner* — Brian P Werner
(74) *Attorney, Agent, or Firm* — Patterson Thuente Christensen, P.A.

(57) ABSTRACT

A three-dimensional image analysis system, a process device for use in the three-dimensional image analysis system, and a method thereof are provided. The three-dimensional image analysis system is configured to generate a plurality of three-dimensional data of a three-dimensional image. The process device defines a plurality of horizontal scan lines and a plurality of vertical scan lines according to the three dimensional data, determines a preliminary edge information of the three-dimensional image according to the horizontal scan lines and the vertical scan lines, divides the three dimensional data into a plurality of groups, compares the groups to determine a plane information of the three-dimensional image, and determines an edge information of the three-dimensional image according to the preliminary edge information and the plane information. The method is adapted for the process device.

26 Claims, 16 Drawing Sheets

THREE-DIMENSIONAL IMAGE ANALYSIS SYSTEM, PROCESS DEVICE, AND METHOD THEREOF

This application claims priority to Chinese Patent Application Serial No. 200910225814.4 filed on Nov. 26, 2009.

CROSS-REFERENCES TO RELATED APPLICATIONS

Not applicable.

BACKGROUND OF THE INVENTION

1. Field of the Invention

The present invention relates to a three-dimensional (3D) image analysis system, a process device for the 3D image analysis system, and a method thereof. More particularly, the 3D image analysis system, the process device for the 3D image analysis system, and the method thereof of the present invention determine edge information of a 3D image a scan line edge detection method and a plane division method.

2. Descriptions of the Related Art

Owing to rapid development and evolvement of science and technology, people are relying more and more on electronic products to acquire desired information. For example, nowadays, people often rely on a mobile guiding device to guide the traveling direction when they are driving a vehicle. Such the mobile guiding device is usually equipped with a screen to display models of buildings and roads in the environment around the vehicle.

To make the models of buildings and roads more consistent with the real environment, the three-dimensional (3D) reconstruction technology has been developed. A conventional 3D reconstruction technology uses a device to scan and capture a scene, and then employs the geometrical principal of the device to construct a preliminary 3D image model. Typically, the 3D image model comprises 3D data of the scene, i.e., a piece of horizontal axis data, a piece of vertical axis data and a piece of depth axis data. Hence, after construction of the 3D image model, edges of the 3D image model are simulated through a quadratic curve approximation method or by calculating orthogonal vectors according to the horizontal axis data, the vertical axis data and the depth axis data. However, because a lot of noises tend to present in the edge information retrieved by these methods, it could not accurately present edges of the scene. As a consequence, it is impossible to display the models of buildings and roads completely on the screen by use of the conventional 3D model reconstruction technology.

Accordingly, an urgent need still exists in the art to provide a solution that can remove undesired noises from the edge information and obtain accurate edge positions to completely reconstruct a 3D image model.

SUMMARY OF THE INVENTION

The primary objective of present invention is to provide a 3D image analysis system, a process device for the 3D image analysis system and a method thereof. The process device determines preliminary edge information of a 3D image model through a scan line division method, and then determines plane information of the 3D image model through a plane division method. In this way, according to the preliminary edge information and the plane information, noises can be removed from the preliminary edge information by the process device so as to determine edge information of the 3D image and reconstruct a 3D image model completely.

To achieve the abovementioned objective, the 3D image analysis system of the present invention comprises a 3D image capturing device and a process device. The 3D image capturing device is configured to generate a plurality of 3D data of a 3D image. The process device is configured to define a plurality of horizontal scan lines and a plurality of vertical scan lines according to the 3D data, determine preliminary edge information of the 3D image according to the horizontal scan lines and the vertical scan lines, divide the 3D data into a plurality of groups, determine plane information of the 3D image by comparing the groups, and determine edge information of the 3D image according to the preliminary edge information and the plane information.

Furthermore, the process device comprises a receive module, an edge detection module, a plane division module and an analysis module. The receive module is configured to receive the 3D data of the 3D image from the 3D image capturing device. The edge detection module is configured to generate the horizontal scan lines and the vertical scan lines according to the 3D data, and configured to determine the preliminary edge information of the 3D image according to the horizontal scan lines and the vertical scan lines. The plane division module is configured to divide the 3D data into a plurality of groups, and configured to determine plane information of the 3D image by comparing the groups. The analysis module is configured to determine the edge information of the 3D image according to the preliminary edge information and the plane information.

Furthermore, the 3D image analysis method for the process device comprises the following steps of: (a) enabling the process device to receive the 3D data of the 3D image from the 3D image capturing device; (b) enabling the process device to define the horizontal scan lines and the vertical scan lines according to the 3D data; (c) enabling the process device to determine the preliminary edge information of the 3D image according to the horizontal scan lines and the vertical scan lines; (d) enabling the process device to divide the 3D data into the plurality of groups; (e) enabling the process device to determine plane information of the 3D image by comparing the groups; and (f) enabling the process device to determine the edge information of the 3D image according to the preliminary edge information and the plane information.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a 3D image analysis system, a process device for the 3D image analysis system and a 3D image analysis method thereof According to the present invention, preliminary edge information of a 3D image is determined (e.g., through a scan line division method) at first, then plane information of the 3D image is determined (e.g., through a plane division method), and finally the plane information is used to remove noises from the preliminary edge information to obtain an accurate edge position.

Embodiments to be described hereinbelow are only provided to illustrate rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
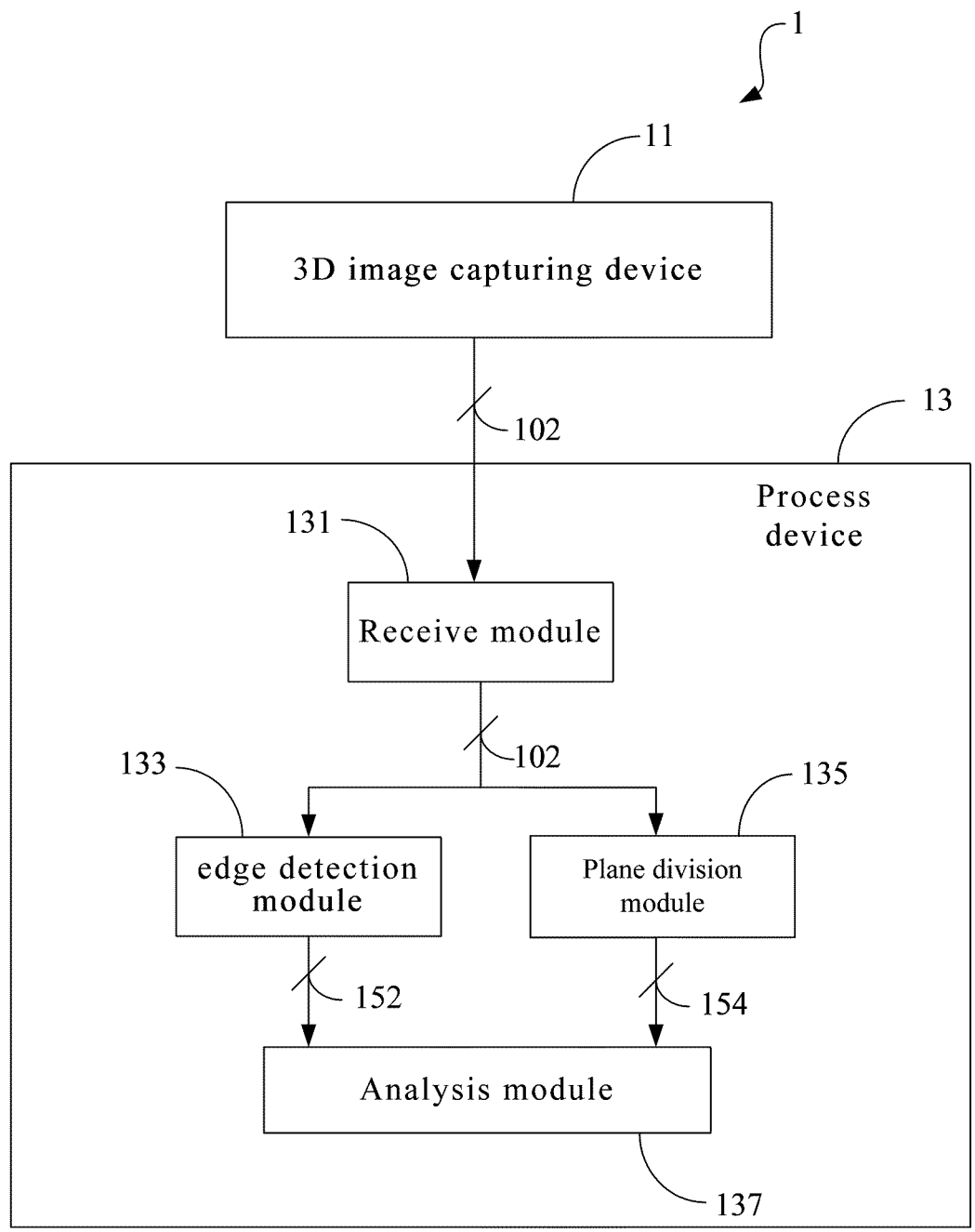
FIG. 1 is a schematic view of a 3D image analysis system according to a first embodiment of the present invention.

FIG. 1 is a schematic view of a 3D image analysis system 1 according to a first embodiment of the present invention. The 3D image analysis system 1 comprises a 3D image capturing device 11 and a process device 13. The process device 13 comprises a receive module 131, an edge detection module 133, a plane division module 135 and an analysis module 137. In this embodiment, the 3D image capturing device 11 is a laser rangefinder; however, in other embodiments, the 3D image capturing device 11 may be replaced by a camera with a depth image capturing functionality or a sonar device. Thus, the 3D image capturing device 11 is not intended to limit the present invention.

Figure 2:
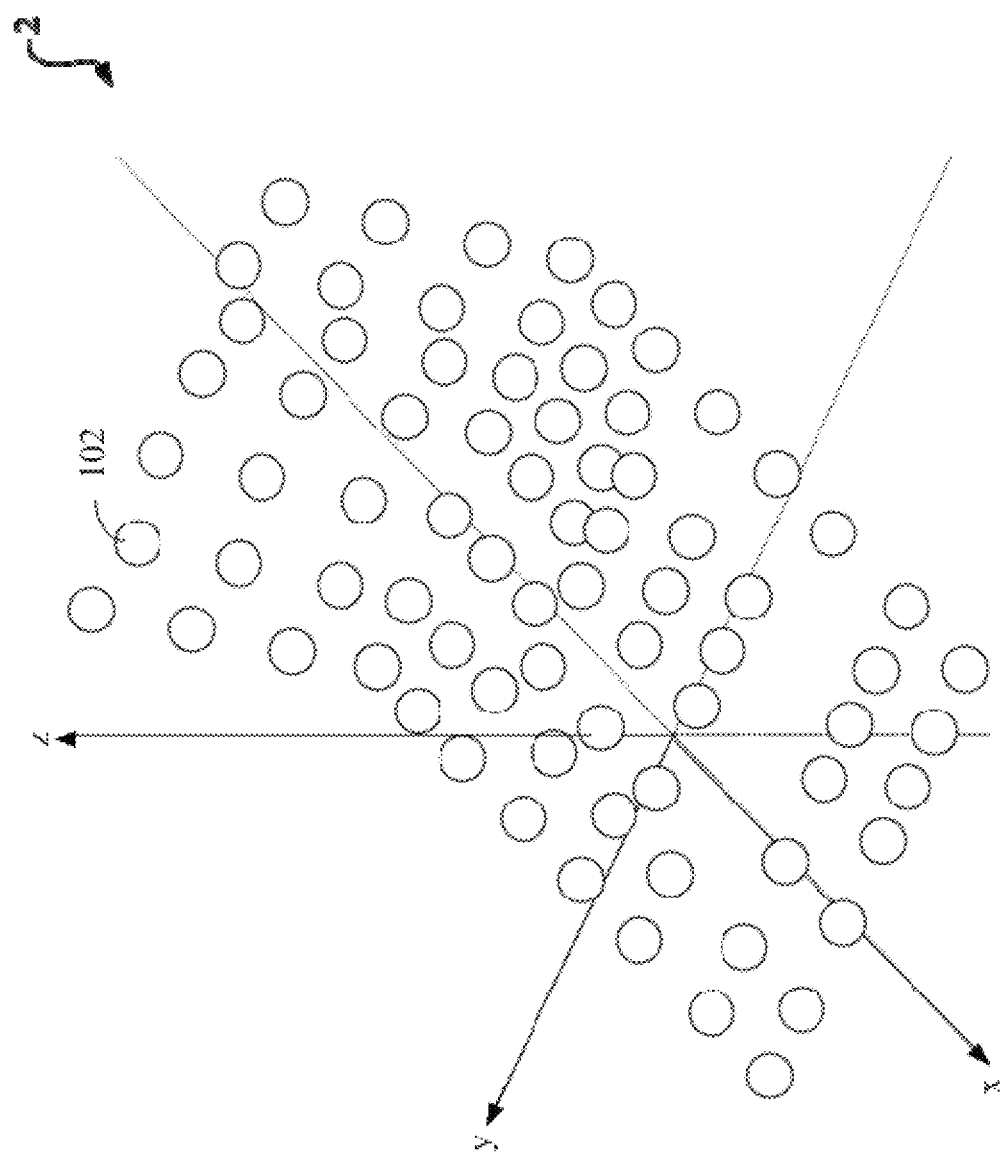
FIGS. 2 to 4 are schematic views of a 3D image model of the first embodiment.
Figure 3:
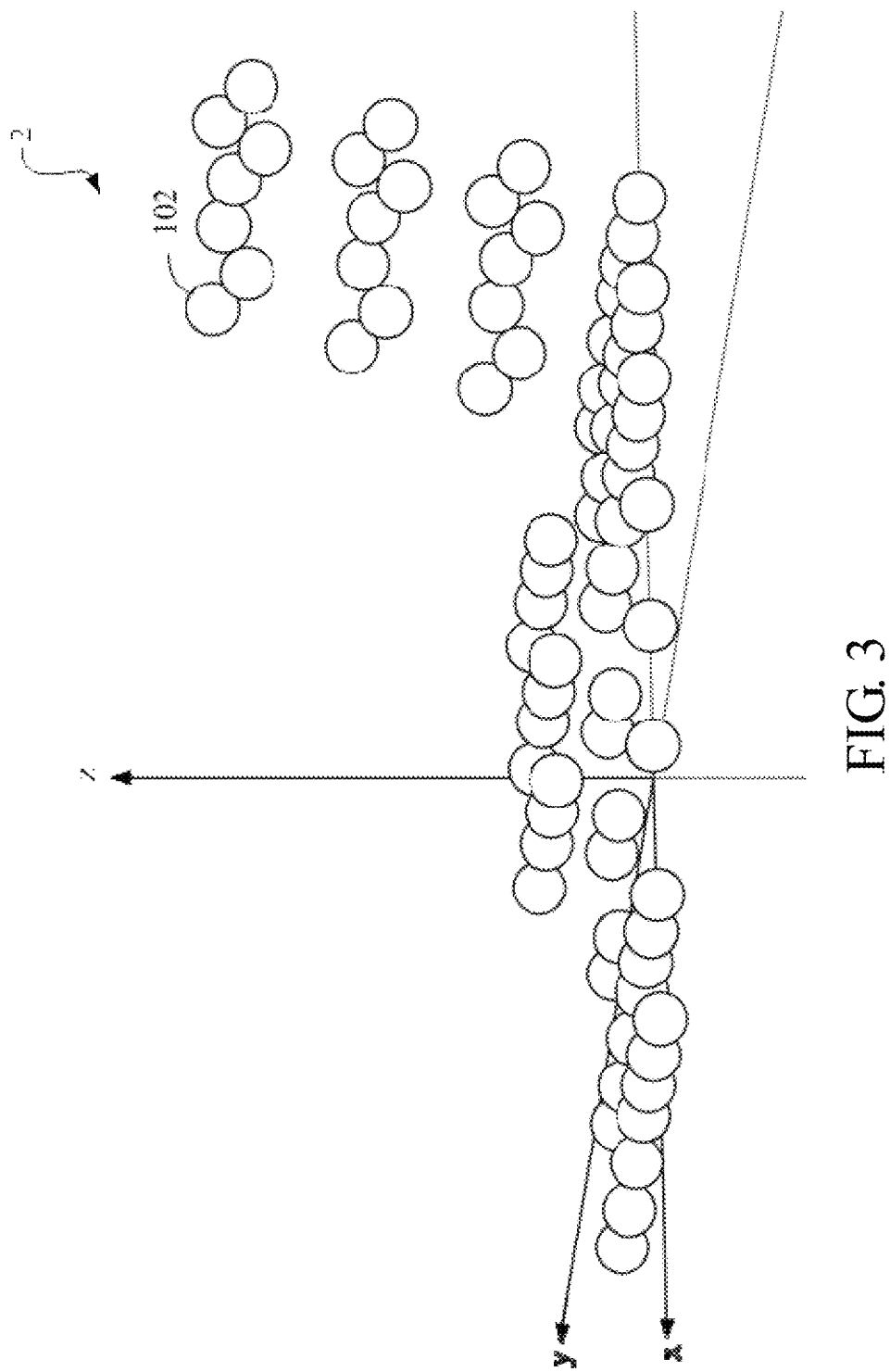
Figure 4:
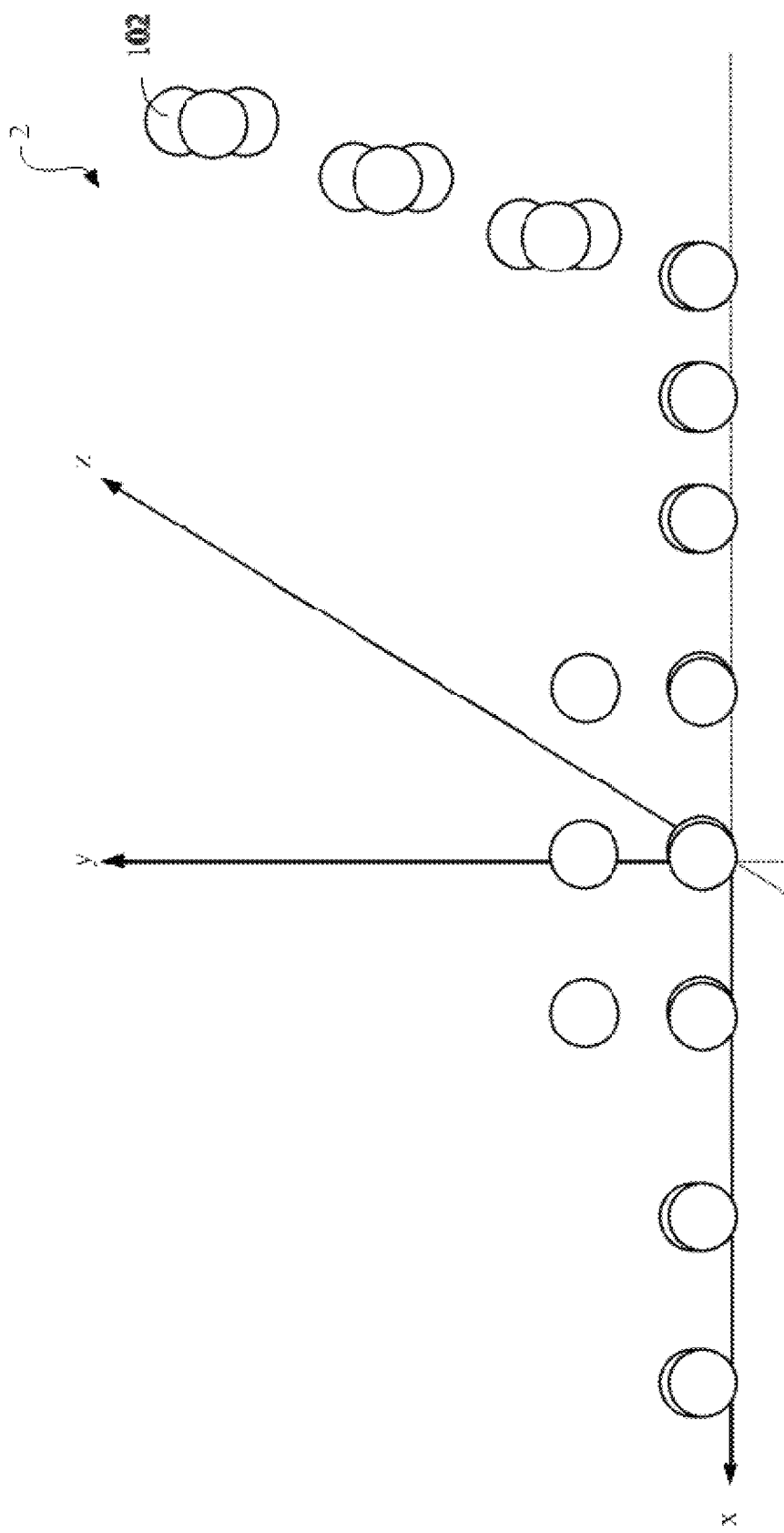

The 3D image capturing device 11 captures a 3D image by scanning a scene and generates a plurality of 3D data 102 of the 3D image. In this embodiment, the 3D data 102 of the 3D image comprises a piece of horizontal axis data (x-axis data), a piece of vertical axis data (y-axis data), and a piece of depth axis data (z-axis data). Based on the 3D data 102, a 3D image model 2 can be constructed. FIGS. 2 to 4 depict the 3D image model 2 from different perspective angles, in which the white dots represent coordinates of the 3D data in the 3D space. In other words, the x-axis datum, the y-axis datum and the z-axis datum of each of the 3D data 102 represent an x-axis coordinate, a y-axis coordinate and a z-axis coordinate of the corresponding dot respectively.

Figure 5:
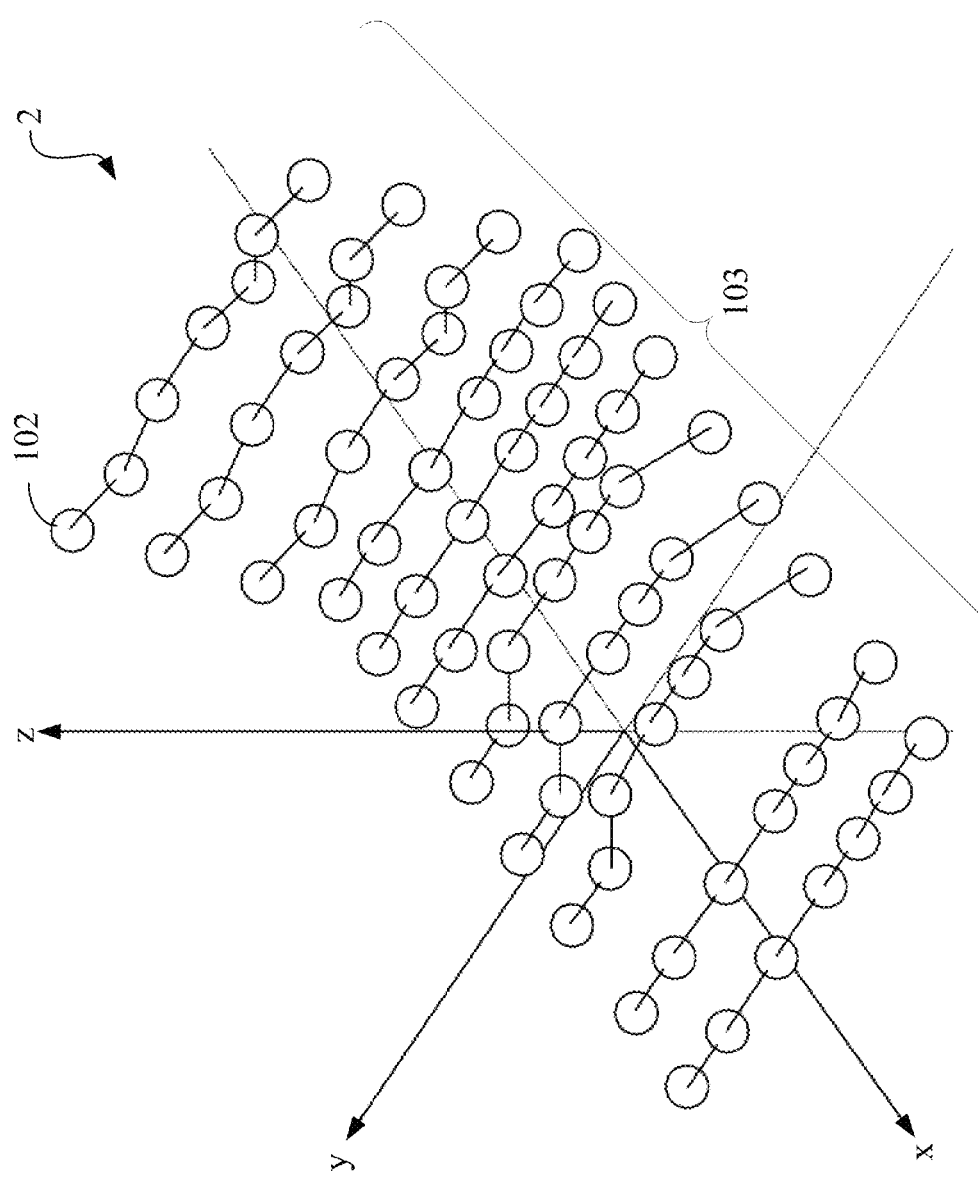
FIG. 5 is a schematic view of horizontal scan lines of the 3D image model.
Figure 6:
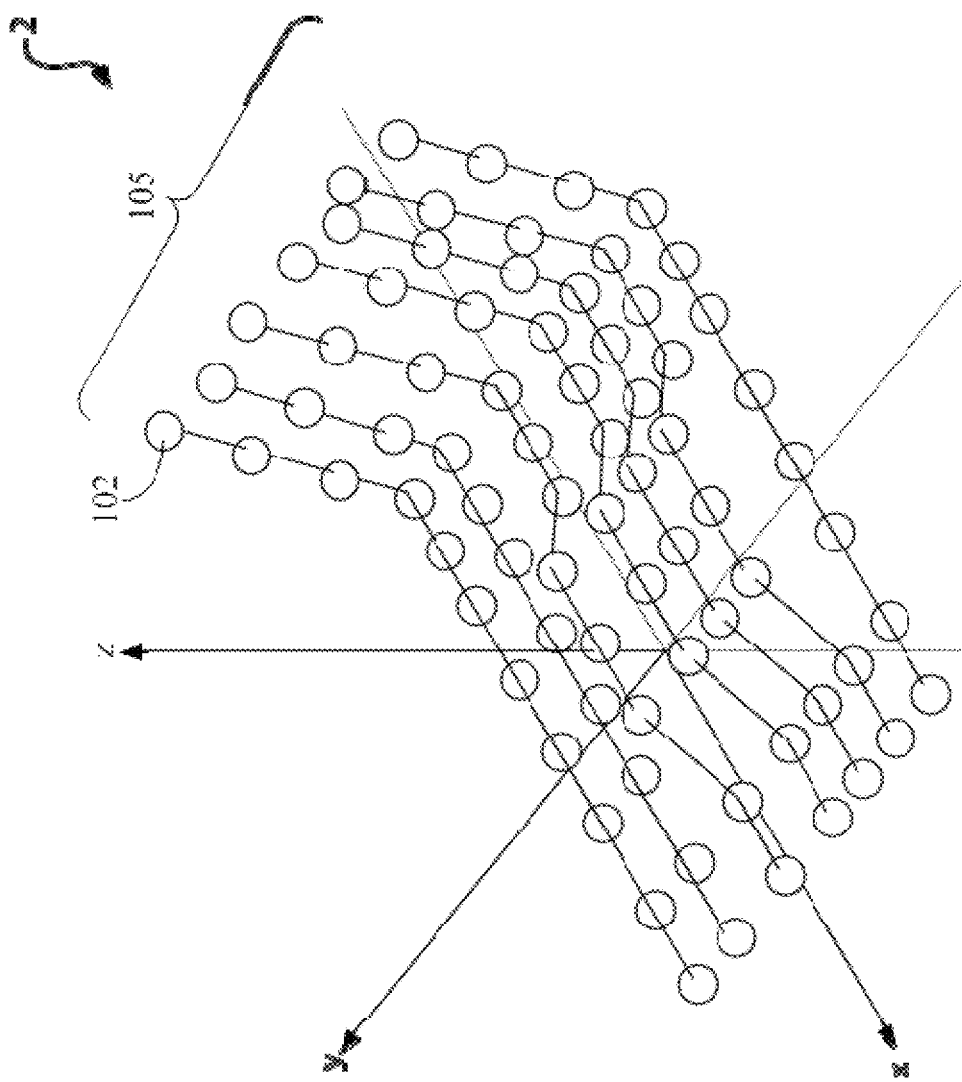
FIG. 6 is a schematic view of vertical scan lines of the 3D image model.

After the 3D data 102 are generated by the 3D image capturing device 11, the receive module 131 of the process device 13 receives the 3D data 102 from the 3D image capturing device 11 in a wired or wireless way. Then, the edge detection module 133 of the process device 13 defines a plurality of horizontal scan lines 103 according to the x-axis data of the 3D data 102, and defines a plurality of vertical scan lines 105 according to the y-axis data of the 3D data 102. Referring to FIG. 5, a schematic view of the horizontal scan lines 103 of the 3D image model 2 is shown therein. Each of the horizontal scan lines 103 (or called as x-axis scan lines) is constructed by 3D data 102 having the same x-axis data. In other words, all 3D data 102 on a same horizontal scan line have the same x-axis coordinate. Referring also to FIG. 6, a schematic view of the vertical scan lines 105 of the 3D image model 2 is shown therein. Likewise, each of the vertical scan lines 105 (or called as y-axis scan lines) is constructed by 3D data 102 having the same y-axis data, so all 3D data 102 on a same vertical scan line have the same y-axis coordinate.

After the horizontal scan lines 103 and the vertical scan lines 105 are defined by the edge detection module 133, the edge detection module 133 of the process device 13 determines preliminary edge information 152 of the 3D image according to the horizontal scan lines 103 and the vertical scan lines 105. For example, the edge detection module 133 may employ a scan line division method to determine the preliminary edge information 152 of the 3D image. When the scan line division method is employed, the edge detection module 133 divides each of the horizontal scan lines 103 and the vertical scan lines 105 into several segments, and then by using a quadratic curve approximation method to process each of the horizontal scan lines 103 and the vertical scan lines 105 that has been divided into several segments, determines a portion of the 3D data 102 to be a plurality of curve nodes 104. Finally, the curve nodes are set as the preliminary edge information 152.

Figure 7A:
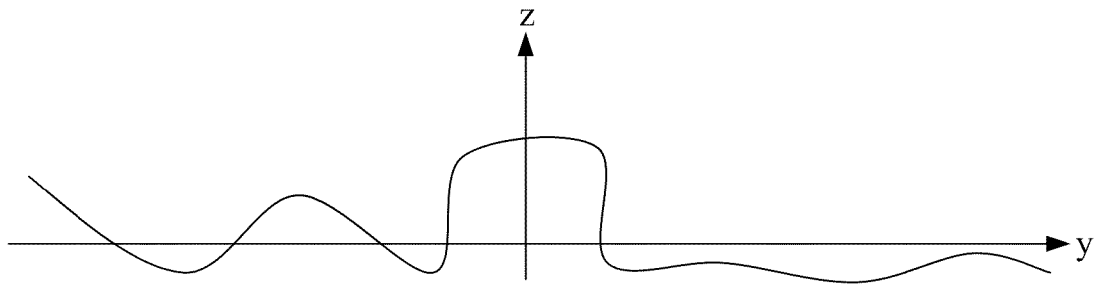
FIGS. 7A-7D are schematic views illustrating a scan line division method.
Figure 7B:
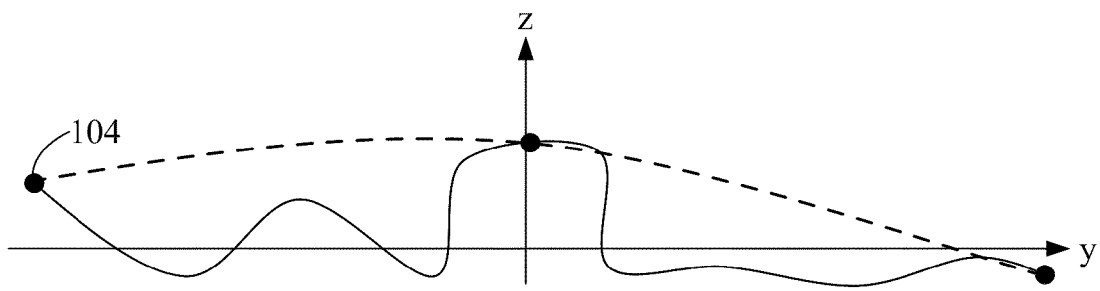
Figure 7C:
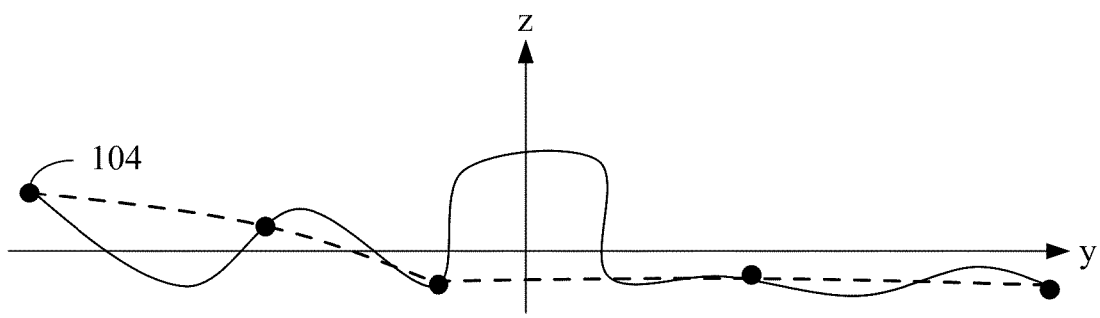
Figure 7D:
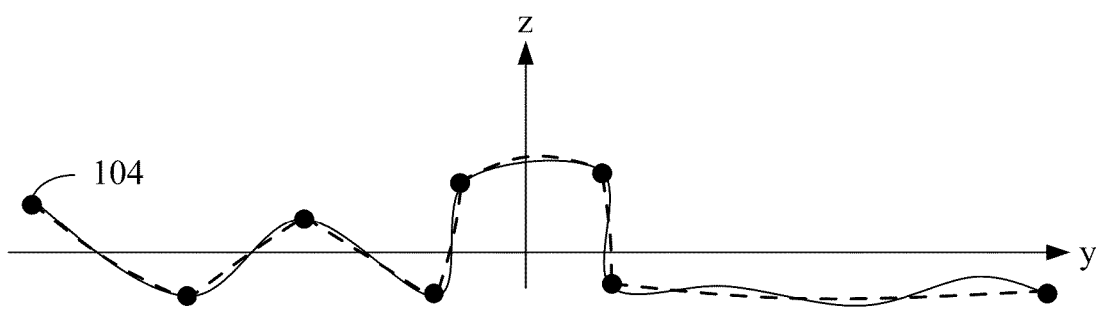

Next, how the edge detection module 133 determines from a horizontal scan line the curve nodes 104 in the 3D data 102 through the scan line division method will be explained with reference to an exemplary example and be schematically illustrated in FIGS. 7A-7D. As can be seen from FIG. 7A, given that x-axis data are all the same along a horizontal scan line, the horizontal scan line is degenerated into a two-dimensional (2D) curve having only y-axis coordinates and z-axis coordinate. Next, as shown in FIG. 7B, the edge detection module 133 divides the horizontal scan line into two segments and then approximates the horizontal scan line with two quadratic curves to determine three curve nodes 104 (i.e., the black dots). Since the two quadratic curves are still inadequate to approximate the horizontal scan line, the edge detection module 133 will further divide the horizontal scan line so as to use more quadratic curves to approximate the horizontal scan line. This process proceeds until the extent to which the quadratic curves approximate the horizontal scan line is less than a specific value. In this exemplary example, operations as shown in FIGS. 7C and 7D are further performed by the edge detection module 133. In FIG. 7C, the edge detection module 133 divides the horizontal scan line into four segments, and uses four quadratic curves to approximate the horizontal scan line to determine five curve nodes 104. Finally, as shown in FIG. 7D, the edge detection module 133 divides the horizontal scan line into seven segments, and uses seven quadratic curves to approximate the horizontal scan line to determine eight curve nodes 104.

By repeating the operations depicted in FIGS. 7A-D on each horizontal scan line 103 and each vertical scan line 105, curve nodes 104 of each horizontal scan line 103 and each vertical scan line 105 can be determined by the edge detection module 133 for use as the preliminary edge information 152.

Figure 8:
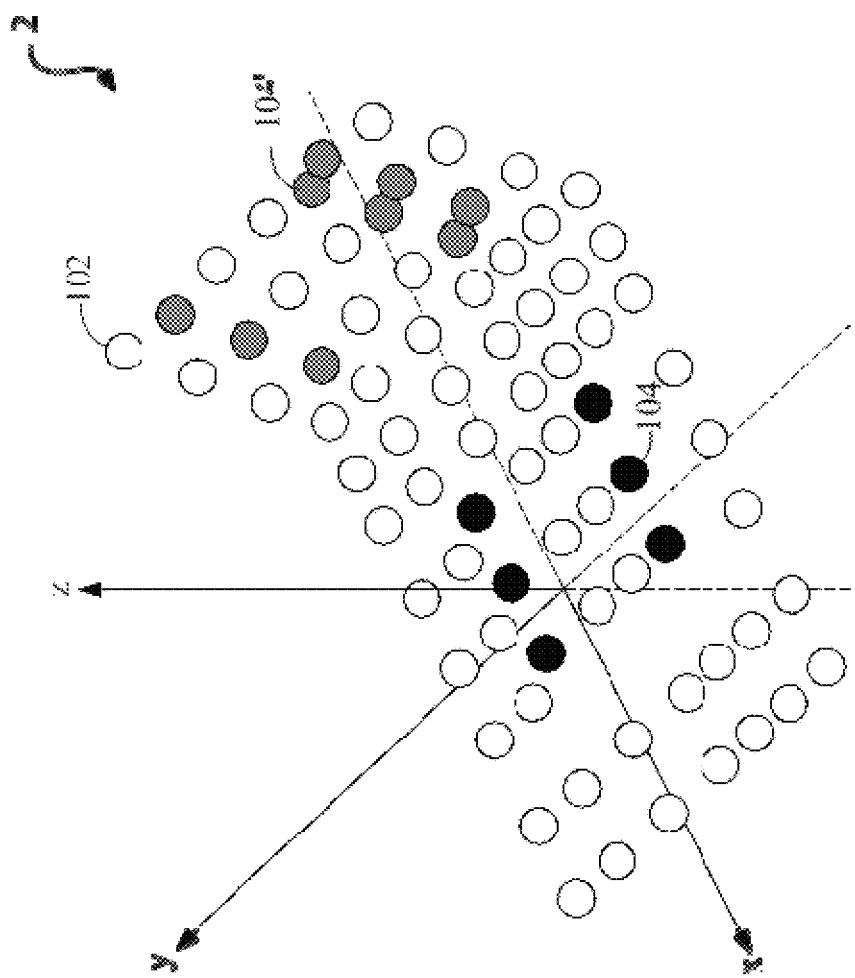
FIG. 8 illustrates curve nodes of the horizontal scan lines.

FIG. 8 depicts curved nodes 104 (i.e., the black dots) and curve nodes 104' (i.e., the grey dots) determined by the edge detection module 133 by processing each of the horizontal scan lines 103 through the scan line division method. It shall be particularly noted that, in the present invention, the curve nodes 104 that are set as the preliminary edge information 152 are only considered as potential but not ascertained edge positions of the 3D image. Therefore, curve nodes are distinguished by the black dots and the grey dots in FIG. 8, in which the black dots indicate that the curve nodes 104 are correct curve nodes (i.e., they are really the edge positions of the 3D image), while the grey dots indicate that the curve nodes 104' are false curve nodes that are falsely determined due to noises (i.e., they are falsely determined as edge positions of the 3D image). As shown in FIG. 8, regions near the curve nodes 104' shall be planes without any curve nodes, so the curve nodes 104' are false ones. It shall be further noted that, distinguishing the curve nodes 104, 104' by different colors in FIG. 8 is merely for purpose to describe that the edge detection module 133 may falsely determine edge positions of the 3D image, and the edge detection module 133 itself has no way to know such cases of false determination.

Figure 9:
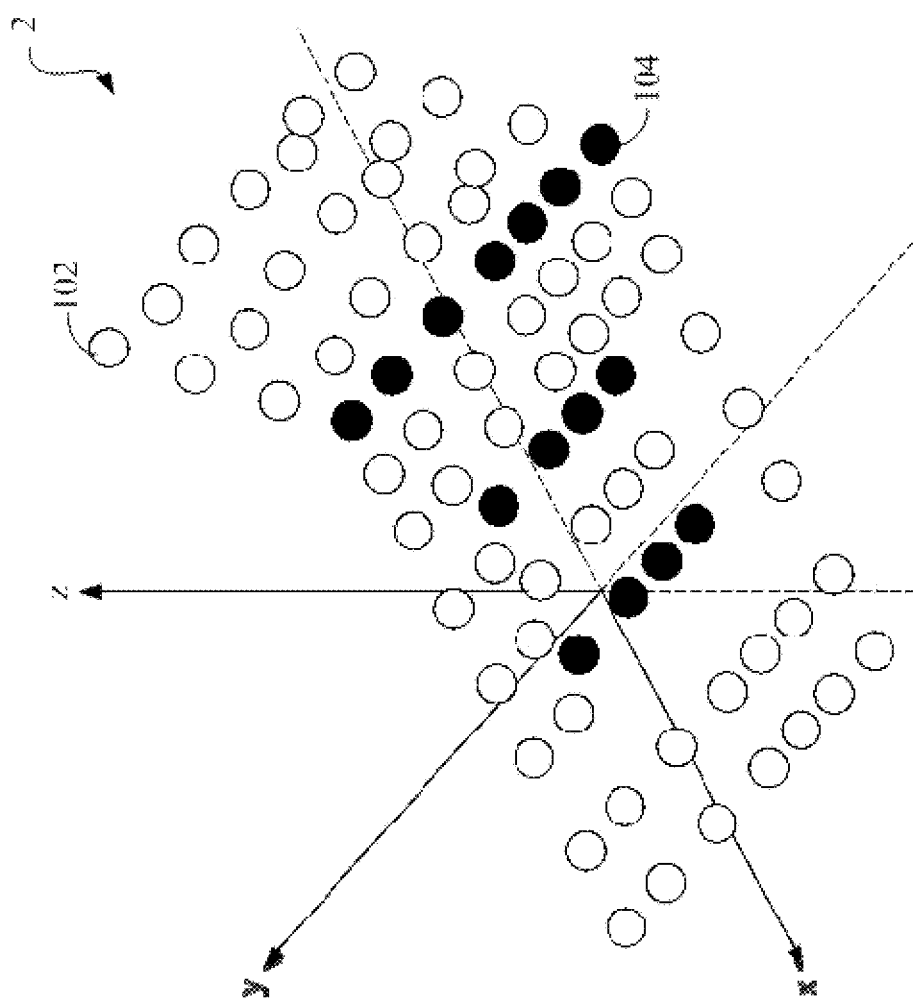
FIG. 9 illustrates curve nodes of the vertical scan lines.
Figure 10:
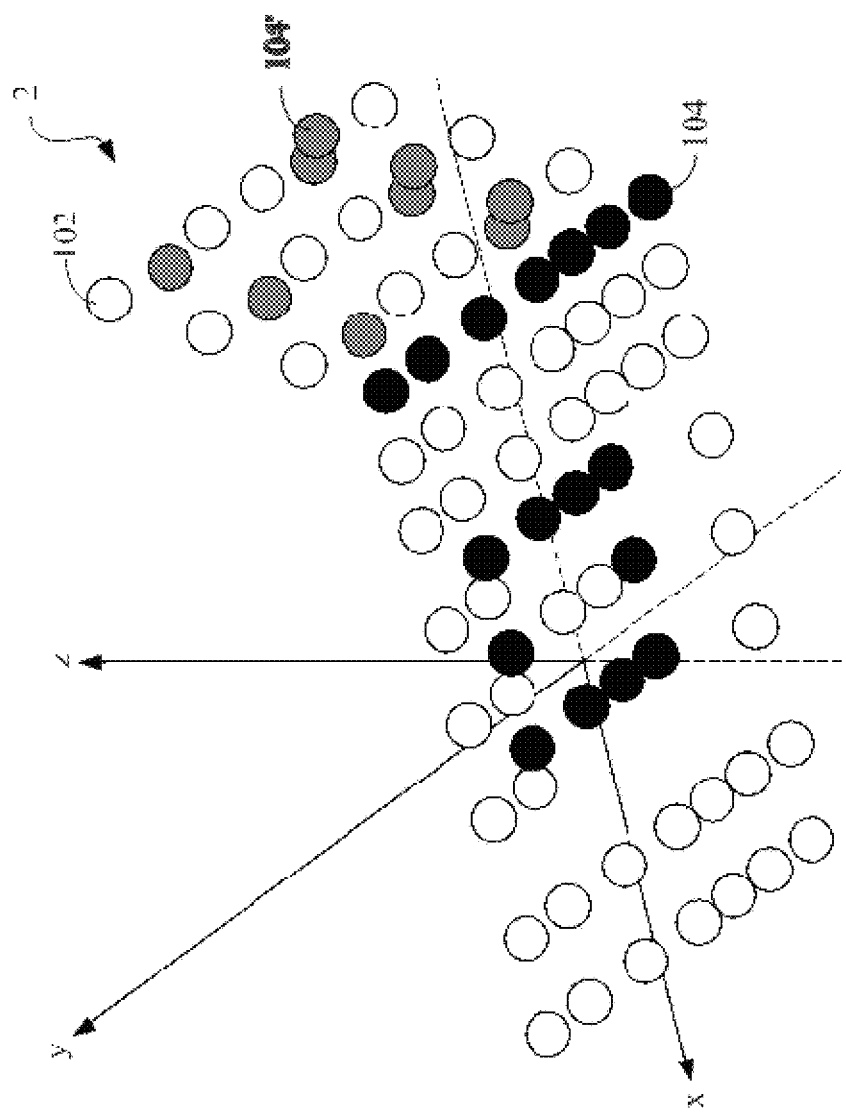
FIG. 10 illustrates curve nodes of the 3D image model.

FIG. 9 depicts the curve nodes 104 (i.e., the black dots) determined by the edge detection module 133 by processing each of the vertical scan lines 105 through the scan line division method. FIG. 10 depicts the results of FIGS. 8 and 9 simultaneously. In other words, FIG. 10 depicts the curve nodes 104 (i.e., the black dots) and the curve nodes 104' (i.e., the grey dots) determined by the edge detection module 133 by processing the horizontal scan lines 103 and the vertical scan lines 105 through the scan line division method. The preliminary edge information 152 determined by the edge detection module 133 comprises the curve nodes 104 and the curve nodes 104'.

To eliminate the false information represented by the curve nodes 104' (i.e., the edge positions falsely determined by the edge detection module 133), the present invention determines plane information 154 of the 3D image through a plane division method and then uses the plane information 154 to correct the preliminary edge information 152 determined through the scan line division method.

Figure 11:
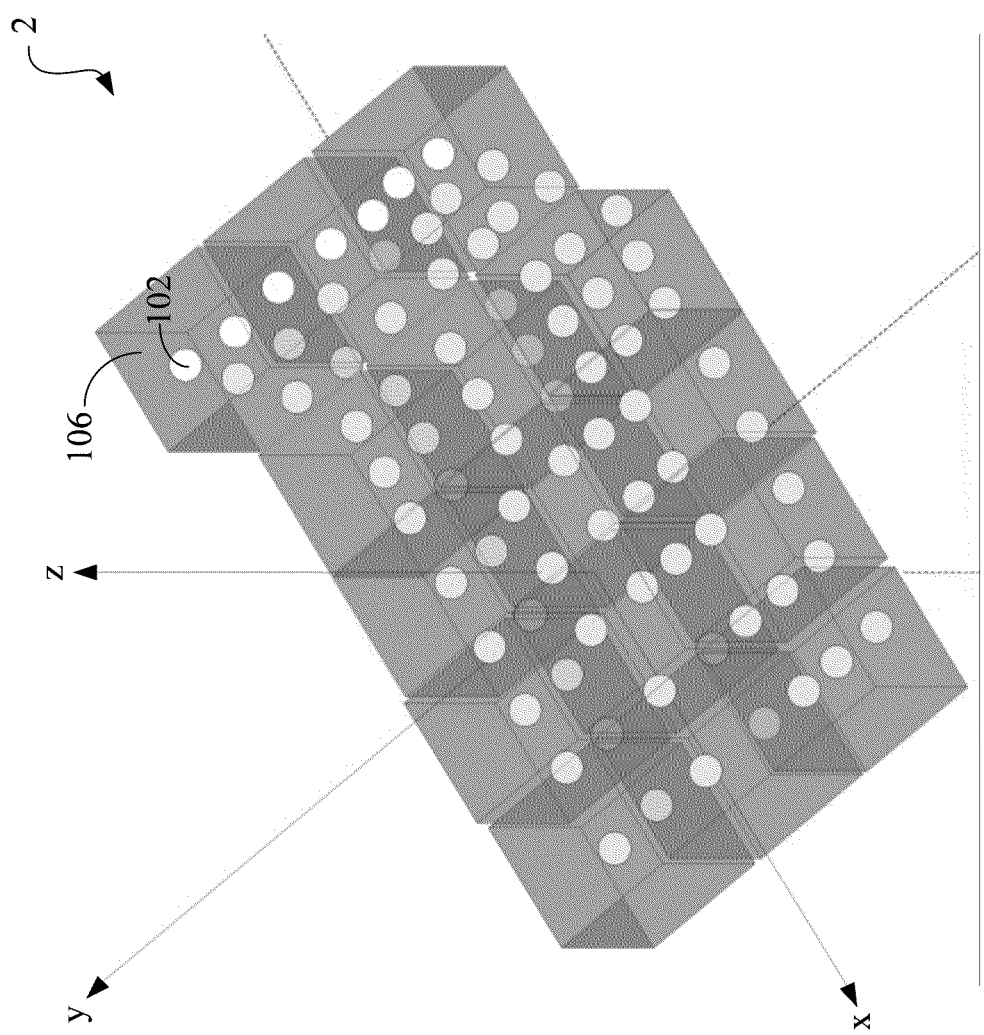
FIG. 11 illustrates the 3D image model after the 3D data are divided into groups.
Figure 12:
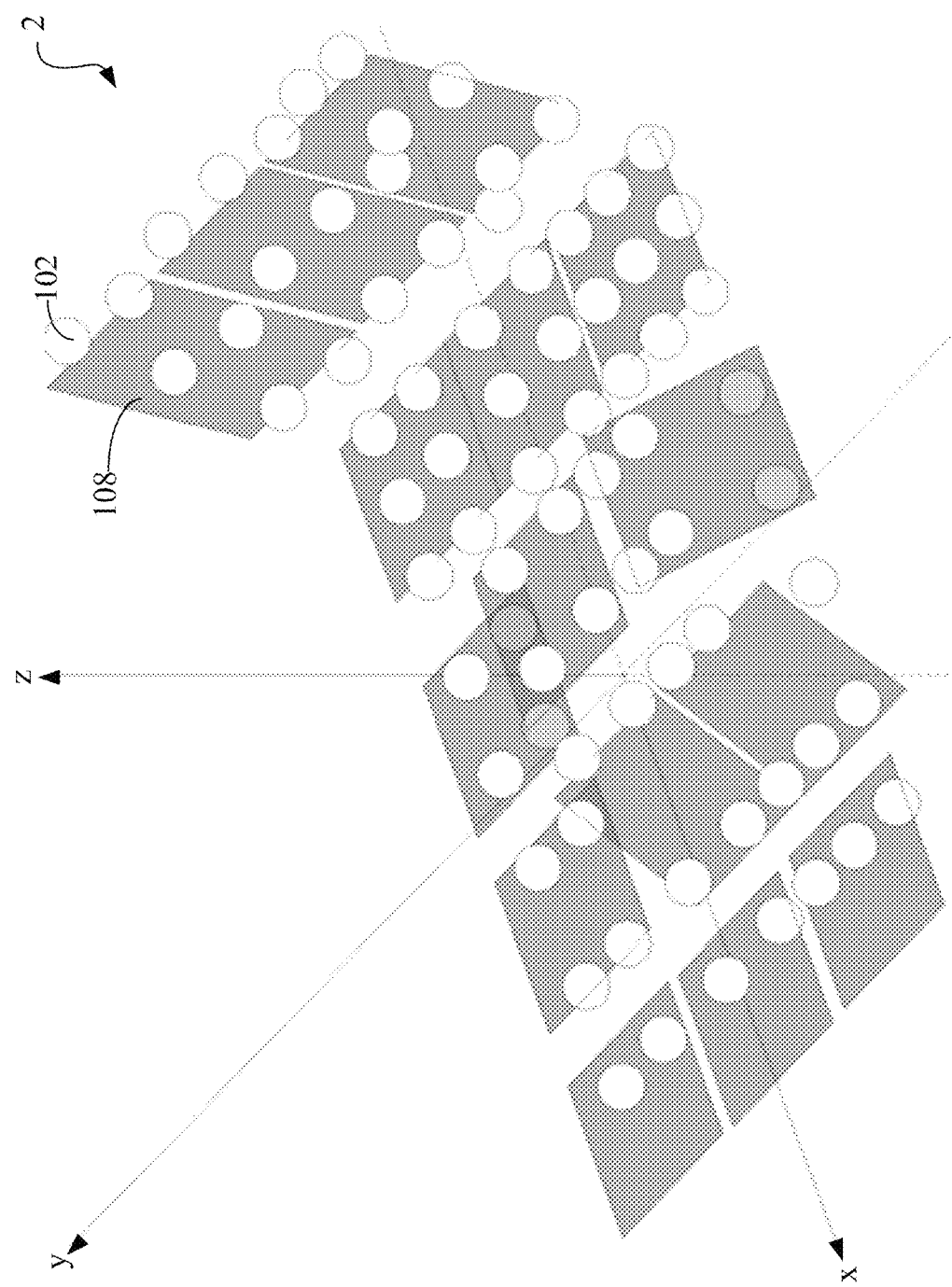
FIG. 12 illustrates planes defined by individual groups.
Figure 13:
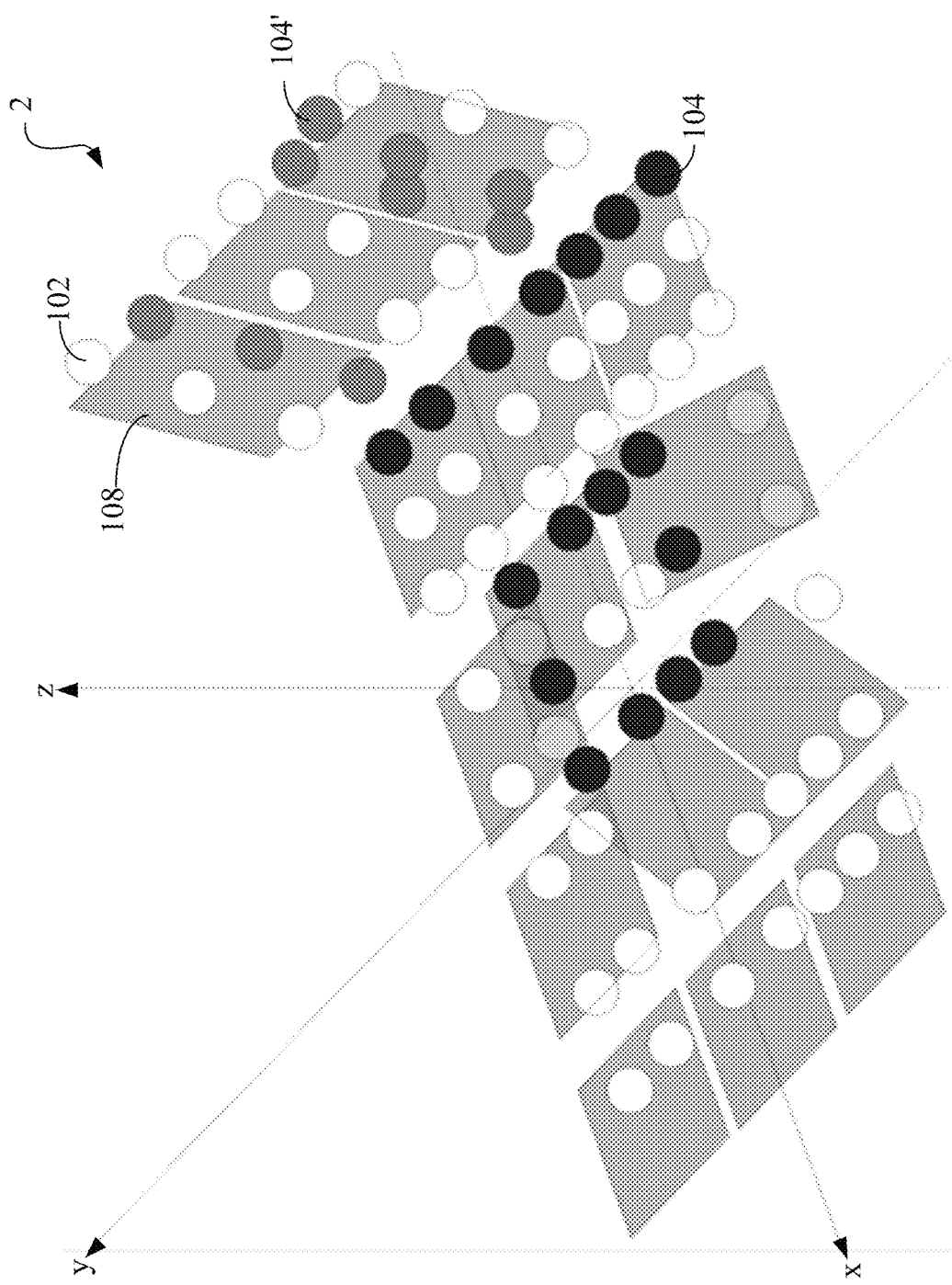
FIG. 13 illustrates the 3D image model with individual planes corresponding to the preliminary edge information.

Next, how the present invention determines the plane information 154 of the 3D image will be explained. The plane division module 135 divides the 3D data 102 into a plurality of groups and then determines the plane information 154 by comparing the groups. For example, the plane division module 135 may divide the 3D data 102 of the 3D image model 2 into a plurality of groups 106 according to the x-axis datum, the y-axis datum and the z-axis datum of each 3D data 102, as shown in FIG. 11. In FIG. 11, 3D data 102 contained in each grey cube belong to a same group 106 because the x-axis data, the y-axis data and the z-axis data of all the 3D data within the same grey cube are approximate to each other respectively. Furthermore, the 3D data 102 in each group 106 may further define a plane 108, as shown in FIG. 12. FIG. 13 combines FIG. 10 and FIG. 12 together to facilitate understanding of the relationship between the plane 108 of the 3D data 102 and the preliminary edge information 152.

Figure 14A:
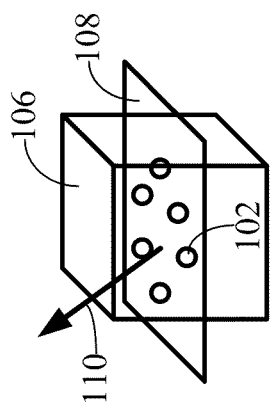
FIG. 14A illustrates a group, a plane defined by the group and a normal vector of the plane.
Figure 14B:
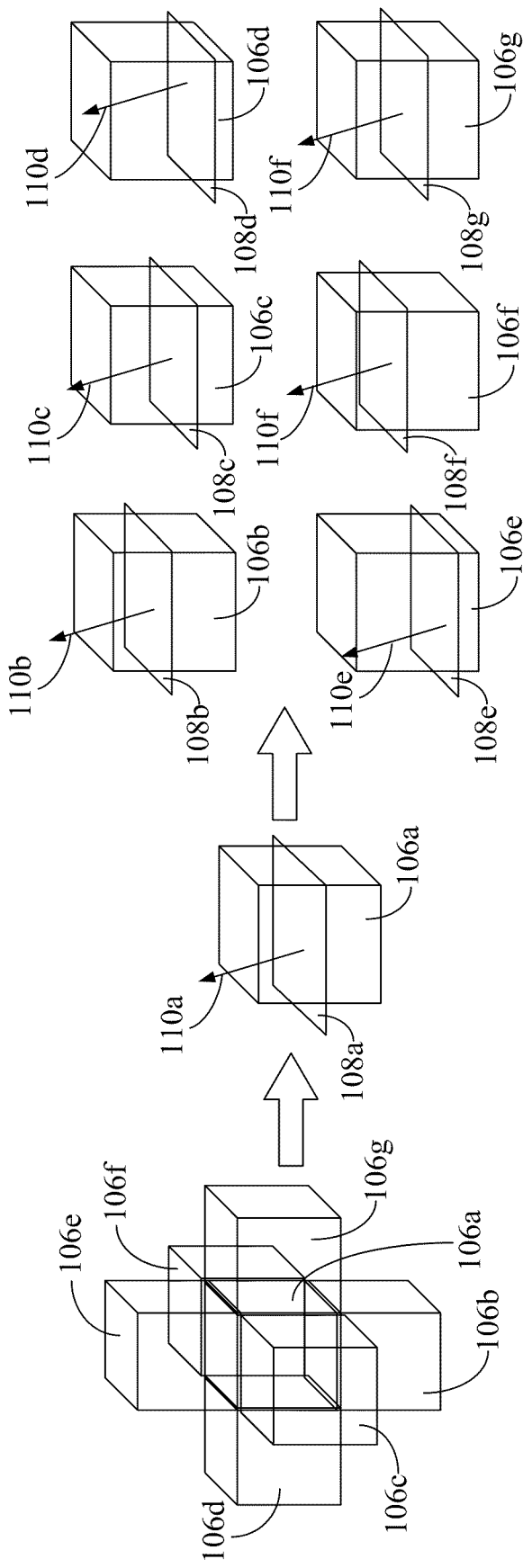
FIG. 14B is a schematic view illustrating comparison of normal vectors of the planes.

Referring to FIG. 14A, a group 106, a plane 108 defined by the group 106, and a normal vector 110 of the plane 108 are depicted therein. The 3D data 102 contained in each group 106 define a plane and the plane has a normal vector. The plane division module 135 may determine plane information 154 of the 3D image by comparing the normal vector 110 of the plane 108 of the group 106 with a normal vector of a plane defined by an adjacent group. The details of the comparison and determination made by the plane division module 135 are referred to FIG. 14B. Because the plane division module 135 divides the 3D data 102 into groups in form of cubes (e.g., the grey cubes shown in FIG. 11 and the transparent cubes shown in FIG. 14B), a group 106a defined by a cube will have adjacent groups 106b, 106c, 106d, 106e, 106f and 106g that are defined by cubes located above, below, to the left of, to the right of, at the front of and at the back of the cube. It shall be appreciated that, in other examples, adjacent groups of a group may be determined in other manners.

The plane division module 135 compares the normal vector 110a of the plane 108a defined by the group 106a with normal vectors 110b, 110c, 110d, 110e, 110f, 110g of planes 108b, 108c, 108d, 108e, 108f, 108g defined by the adjacent groups 106b, 106c, 106d, 106e, 106f, 106g. If an angle included between the normal vector 110a and each of the normal vectors 110b, 110c, 110d, 110e, 110f, 110g is less than a preset angle, then the plane division module 135 determines that the region defined by the 3D data 102 of the group 106a is a plane. According to the above description, it is understood that the plane division module 135 determines the plane information 154 of the 3D image model 2 by comparing the normal vectors of the planes 108 defined by the groups 106. The plane information 154 determines a region that is a plane in the 3D image model 2.

Figure 15:
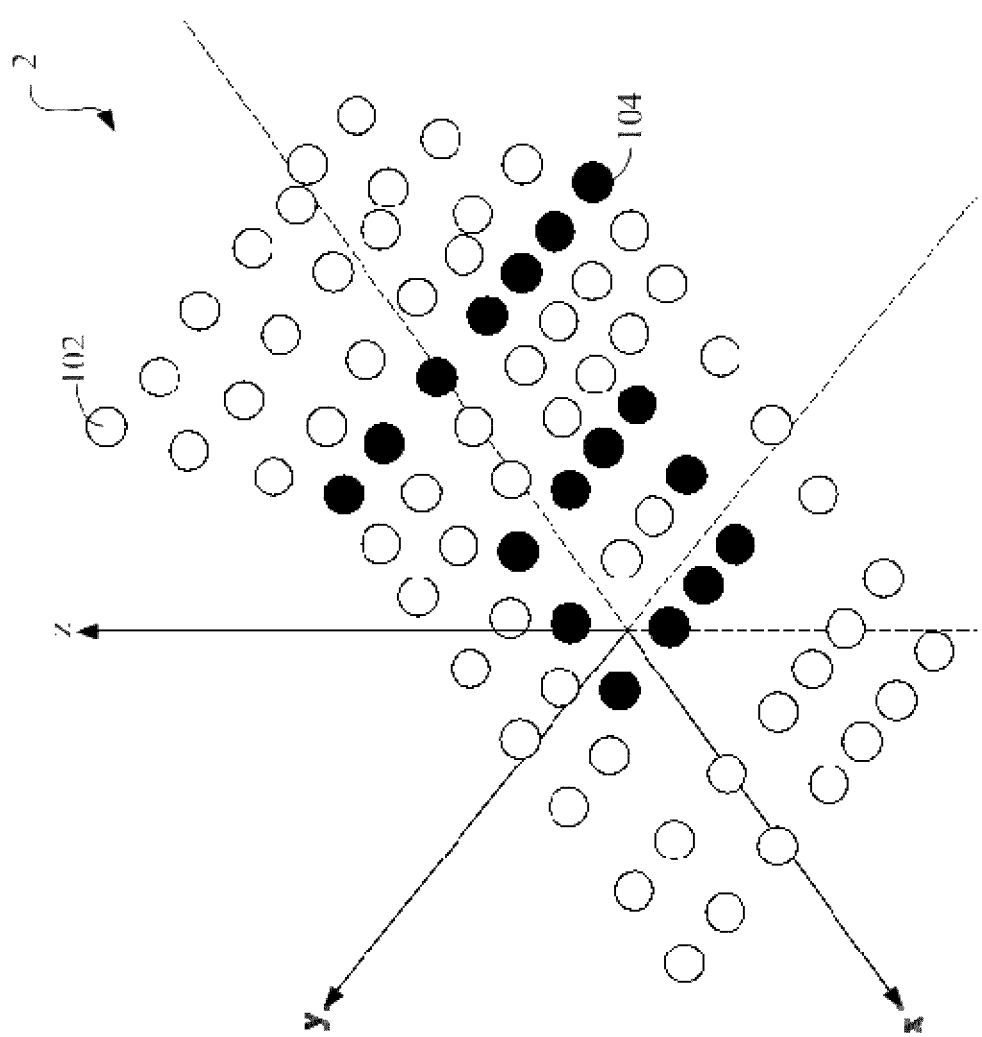
FIG. 15 illustrates the 3D image model after false curve nodes have been corrected.

Finally, the analysis module 137 determines edge information of the 3D image according to the preliminary edge information 152 and the plane information 154. For example, by comparing the preliminary edge information 152 and the plane information 154, the analysis module 137 may determine 3D data that belong to the preliminary edge information 152 but don't belong to the plane information 154 to be the edge information. Based on the plane information 154 determined by the plane division module 135, the analysis module 137 learns that regions containing the curve nodes 104' have been determined to be planes by the plane division module 135. Therefore, the analysis module 137 can determine the edge information by using the plane information 154 to correct the preliminary edge information 152 determined by the edge detection module 133; that is, the edge information contains only the curve nodes 104. FIG. 15 depicts the edge information of the 3D image determined by the analysis module 137 according to the preliminary edge information 152 and the plane information 154. As can be seen from FIG. 15, the results falsely determined by the edge detection module 133 have been corrected by the analysis module 137, so the final edge information contains only the correct curve nodes 104.

As a result, correct edge information of a 3D image of any scene can be obtained by the 3D image analysis system 1 of the present invention so that a 3D image model of the 3D image can be reconstructed according to the edge information.

Figure 16:
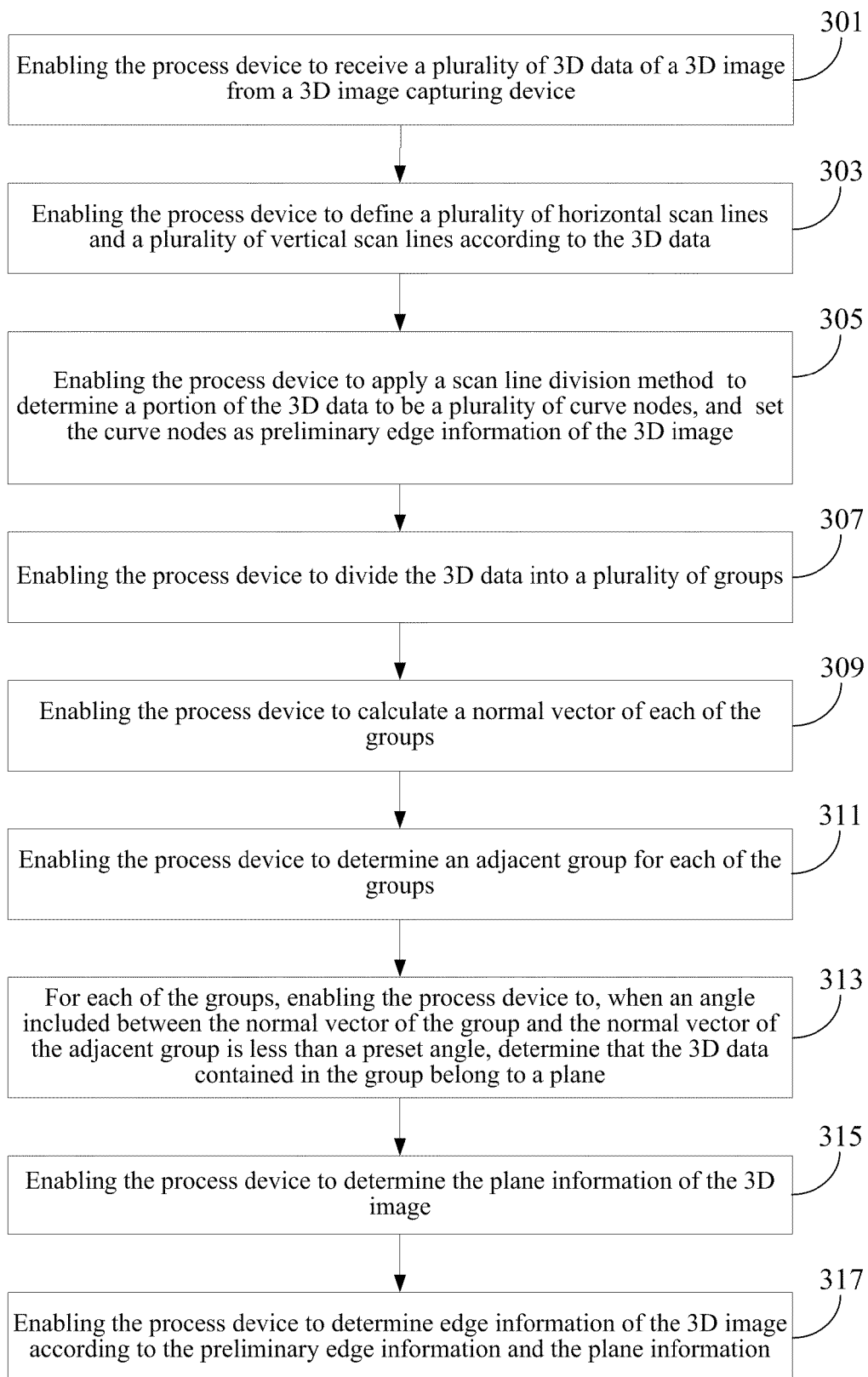
FIG. 16 is a flowchart of a 3D image analysis method of the present invention.

A second embodiment of the present invention is a 3D image analysis method, a flowchart of which is depicted in FIG. 16. The 3D image analysis method may be applied to the first process device 13 of the first embodiment.

Firstly, step 301 is executed to enable the process device 13 to receive a plurality of 3D data 102 of a 3D image from the 3D image capturing device 11. Each of the 3D data 102 comprises an x-axis datum, a y-axis datum and a z-axis datum. Then, step 303 is executed to enable the process device 13 to define a plurality of horizontal scan lines according to the x-axis data of the 3D data 102, and define a plurality of vertical scan lines according to the y-axis data of the 3D data 102.

Next, step 305 is executed to enable the process device 13 to determine preliminary edge information of the 3D image according to the horizontal scan lines and the vertical scan lines. More specifically, in the step 305, the process device 13 applies a scan line division method to divide each of the horizontal scan lines and each of the vertical scan lines and to process the divided scan lines through a quadratic curve approximation method to determine a portion of the 3D data to be a plurality of curve nodes, and sets the curve nodes as preliminary edge information of the 3D image.

Afterwards, step 307 is executed to enable the process device 13 to divide the 3D data 102 into a plurality of groups 106 according to the x-axis datum, the y-axis datum and the z-axis datum of each of the 3D data. Then, the 3D image analysis method proceeds to steps 309, 311, 313 and 315 to enable the process device 13 to determine plane information of the 3D image by comparing these groups with each other. More specifically, step 309 is executed to enable the process device 13 to calculate a normal vector of each of the groups. Step 311 is executed to enable the process device 13 to determine an adjacent group for each of the groups. Next, step 313 is executed to enable the process device 13 to, when an angle included between the normal vector of the group and the normal vector of the adjacent group is less than a preset angle, determine that the 3D data contained in the group belong to a plane. Thereafter, step 315 is executed to enable the process device to determine the plane information of the 3D image. Finally, step 317 is executed to enable the process device to determine edge information of the 3D image according to the preliminary edge information and the plane information, i.e., to determine 3D data that belong to the preliminary edge information but don't belong to the plane information to be the edge information by comparing the preliminary edge information with the plane information.

In addition to the aforesaid steps, the second embodiment can also execute all the operations and functions set forth in the first embodiment. How the second embodiment executes these operations and functions will be readily appreciated by those of ordinary skill in the art based on the explanation of the first embodiment, and thus will not be further described herein.

As described above, the present invention obtains accurate edge positions of a 3D image by using plane information of the 3D image to correct edge curve nodes of the 3D image that have been falsely determined in a scan line division method due to noises. In more detail, the present invention determines preliminary edge information of the 3D image through the scan line division method, and then determines plane information of the 3D image through a plane division method. In this way, by comparing the preliminary edge information with the plane information, false information generated in the scan line division method due to the noises can be removed effectively so as to reconstruct a 3D image model completely.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A three-dimensional (3D) image analysis system, comprising:
   a 3D image capturing device, being configured to generate a plurality of 3D data of a 3D image; and
   a process device, being configured to receive the 3D data in a wired way or a wireless way, define a plurality of horizontal scan lines and a plurality of vertical scan lines according to the 3D data, determine preliminary edge information of the 3D image according to the horizontal scan lines and the vertical scan lines, divide the 3D data into a plurality of groups, determine plane information of the 3D image by comparing the groups, and determine edge information of the 3D image according to the preliminary edge information and the plane information.

2. The 3D image analysis system as claimed in claim 1, wherein the process device comprises a receive module configured to receive the 3D data from the 3D image capturing device in a wired way or a wireless way.

3. The 3D image analysis system as claimed in claim 2, wherein each of the 3D data comprises a horizontal axis datum, a vertical axis datum, and a depth axis datum.

4. The 3D image analysis system as claimed in claim 3, wherein the process device further comprises an edge detection module coupled to the receive module and configured to define the horizontal scan lines according to the horizontal axis data and define the vertical scan lines according to the vertical axis data.

5. The 3D image analysis system as claimed in claim 4, wherein the edge detection module is configured to apply a scan line division method to divide each of the horizontal scan lines and each of the vertical scan lines and process the divided scan lines through a quadratic curve approximation method to determine a portion of the 3D data to be a plurality of curve nodes, and set the curve nodes as the preliminary edge information.

6. The 3D image analysis system as claimed in claim 5, wherein the process device further comprises a plane division module coupled to the receive module and configured to divide the 3D data into the plurality of groups according to the horizontal axis data, the vertical axis data and the depth axis data of each of the 3D data.

7. The 3D image analysis system as claimed in claim 6, wherein the plane division module is further configured to calculate a normal vector of each of the groups and determine the plane information of the 3D image by comparing the normal vectors, and wherein the plane information comprises a portion of the 3D data.

8. The 3D image analysis system as claimed in claim 7, wherein the plane division module is further configured to determine an adjacent group for each of the groups and, when an angle included between the normal vector of the group and the normal vector of the adjacent group is less than a preset angle, determine that the 3D data contained in the group belong to a plane.

9. The 3D image analysis system as claimed in claim 7, further comprising an analysis module coupled to the edge detection module and the plane division module and configured to compare the preliminary edge information with the plane information and determine 3D data that belong to the preliminary edge information but don't belong to the plane information to be the edge information.

10. The 3D image analysis system as claimed in claim 1, wherein the 3D image capturing device is a laser rangefinder.

11. A 3D image analysis method for a process device, the process device being adapted for use in combination with a 3D image capturing device, the method being executed by the process device and comprising the following steps of:
   (a) receiving a plurality of 3D data of a 3D image from the 3D image capturing device;
   (b) defining a plurality of horizontal scan lines and a plurality of vertical scan lines according to the 3D data;
   (c) determining preliminary edge information of the 3D image according to the horizontal scan lines and the vertical scan lines;
   (d) dividing the 3D data into a plurality of groups;
   (e) determining plane information of the 3D image by comparing the groups; and (f) determining edge information of the 3D image according to the preliminary edge information and the plane information.

12. The 3D image analysis method as claimed in claim 11, wherein each of the 3D data comprises a horizontal axis data, a vertical axis data, and a depth axis data.

13. The 3D image analysis method as claimed in claim 12, wherein the step (b) is defining the horizontal scan lines according to the horizontal axis data and defining the vertical scan lines according to the vertical axis data.

14. The 3D image analysis method as claimed in claim 13, wherein the step (c) comprises the following steps of:
   applying a scan line division method to divide each of the horizontal scan lines and each of the vertical scan lines and process the divided scan lines through a quadratic curve approximation method to determine a portion of the 3D data to be a plurality of curve nodes; and
   setting the curve nodes as the preliminary edge information.

15. The 3D image analysis method as claimed in claim 14, wherein the step (d) is dividing the 3D data into the plurality of groups according to the horizontal axis data, the vertical axis data and the depth axis data of each of the 3D data.

16. The 3D image analysis method as claimed in claim 15, wherein the step (e) comprises the following steps of:
   calculating a normal vector of each of the groups; and
   determining the plane information of the 3D image by comparing the normal vectors, wherein the plane information comprises a portion of the 3D data.

17. The 3D image analysis method as claimed in claim 16, wherein the step (e) comprises the following steps of:
   determining an adjacent group for each of the groups; and
   for each of the groups, when an angle included between the normal vector of the group and the normal vector of the adjacent group is less than a preset angle, determining that the 3D data contained in the group belong to a plane.

18. The 3D image analysis method as claimed in claim 16, wherein the step (f) is determining 3D data that belong to the preliminary edge information but don't belong to the plane information to be the edge information by comparing the preliminary edge information and the plane information.

19. A process device for use in a 3D image analysis system to analyze a 3D image, the 3D image analysis system comprising a 3D image capturing device and the process device, the process device comprising:
   a receive module, being configured to receive a plurality of 3D data of the 3D image from the 3D image capturing device in a wired way or a wireless way;
   an edge detection module, being coupled to the receive module and configured to generate a plurality of horizontal scan lines and a plurality of vertical scan lines according to the 3D data, and configured to determine preliminary edge information of the 3D image according to the horizontal scan lines and the vertical scan lines;
   a plane division module, being coupled to the receive module and configured to divide the 3D data into a plurality of groups, and configured to determine plane information of the 3D image by comparing the groups; and
   an analysis module, being coupled to the edge detection module and the plane division module and configured to determine edge information of the 3D image according to the preliminary edge information and the plane information.

20. The process device as claimed in claim 19, wherein each of the 3D data comprises an horizontal axis data, a vertical axis data, and a depth axis data.

21. The process device as claimed in claim 20, wherein the edge detection module is configured to define the horizontal scan lines according to the horizontal axis data and define the vertical scan lines according to the vertical axis data.

22. The process device as claimed in claim 21, wherein the edge detection module is configured to apply a scan line division method to divide each of the horizontal scan lines and each of the vertical scan lines and process the divided scan lines through a quadratic curve approximation method to determine a portion of the 3D data to be a plurality of curve nodes, and set the curve nodes as the preliminary edge information.

23. The process device as claimed in claim 22, wherein the plane division module is configured to divide the 3D data into the plurality of groups according to the horizontal axis data, the vertical axis data and the depth axis data of each of the 3D data.

24. The process device as claimed in claim 23, wherein the plane division module is further configured to calculate a normal vector of each of the groups and determine the plane information of the 3D image by comparing the normal vectors, and wherein the plane information comprises a portion of the 3D data.

25. The process device as claimed in claim 24, wherein the plane division module is further configured to determine an adjacent group for each of the groups and, when an angle included between the normal vector of the group and the normal vector of the adjacent group is less than a preset angle, determine that the 3D data contained in the group belong to a plane.

26. The process device as claimed in claim 24, wherein the analysis module is configured to compare the preliminary edge information with the plane information and determine 3D data that belong to the preliminary edge information but don't belong to the plane information to be the edge information.

* * * * *